US012210510B2

(12) United States Patent
Plush et al.

(10) Patent No.: US 12,210,510 B2
(45) Date of Patent: *Jan. 28, 2025

(54) MERGING AND UNMERGING ENTITY REPRESENTATIONS VIA RESOLVER TREES

(71) Applicant: CrowdStrike, Inc., Sunnyvale, CA (US)

(72) Inventors: James Robert Plush, Lake Forest, CA (US); Timothy Jason Berger, Eastvale, CA (US); Ramnath Venugopalan, Webster, NY (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,943

(22) Filed: Mar. 20, 2024

(65) Prior Publication Data
US 2024/0232170 A1 Jul. 11, 2024

Related U.S. Application Data

(63) Continuation of application No. 17/576,782, filed on Jan. 14, 2022, now Pat. No. 11,960,470.

(51) Int. Cl.
*G06F 16/23* (2019.01)
*G06F 7/14* (2006.01)
*G06F 16/22* (2019.01)
*G06F 16/28* (2019.01)

(52) U.S. Cl.
CPC .......... *G06F 16/2365* (2019.01); *G06F 7/14* (2013.01); *G06F 16/2246* (2019.01); *G06F 16/2358* (2019.01); *G06F 16/288* (2019.01)

(58) Field of Classification Search
None
See application file for complete search history.

(56) References Cited

U.S. PATENT DOCUMENTS

| | | |
|---|---|---|
| 2018/0276280 A1 | 9/2018 | Trudel |
| 2020/0134076 A1 | 4/2020 | Ogrinz |
| 2021/0191919 A1 | 6/2021 | Perkov |
| 2022/0019571 A1 | 1/2022 | Singh |
| 2022/0391381 A1 | 12/2022 | Thimbleby |
| 2023/0229652 A1 | 7/2023 | Plush |

*Primary Examiner* — Eddy Cheung
(74) *Attorney, Agent, or Firm* — Lee & Hayes, P.C.

(57) ABSTRACT

A digital security system can store data associated with entities in resolver trees. If the digital security system determines that two resolver trees are likely representing the same entity, the digital security system can use a merge operation to merge the resolver trees into a single resolver tree that represents the entity. The single resolver tree can include a merge node indicating a merge identifier of the merge operation. Nodes containing information merged into the resolver tree from another resolver tree during the merge operation can be tagged with the corresponding merge identifier. Accordingly, if the merge operation is to be undone, for instance if subsequent information indicates that the entries are likely separate entities, the resolver tree can be unmerged and the nodes tagged with the merge identifier can be restored to a separate resolver tree.

20 Claims, 7 Drawing Sheets

MERGING AND UNMERGING ENTITY REPRESENTATIONS VIA RESOLVER TREES

PRIORITY

This application is a continuation of, and claims priority to, U.S. patent application Ser. No. 17/576,782, filed on Jan. 14, 2022, which is fully incorporated by reference herein in its entirety.

TECHNICAL FIELD

The present disclosure relates to digital security systems, particularly with respect to merging and unmerging entity data.

BACKGROUND

Digital security exploits that steal or destroy resources, data, and private information on computing devices are an increasing problem. Governments and businesses devote significant resources to preventing intrusions and thefts related to such digital security exploits. Some of the threats posed by security exploits are of such significance that they are described as cyber terrorism or industrial espionage.

Security threats come in many forms, including computer viruses, worms, trojan horses, spyware, keystroke loggers, adware, and rootkits. Such security threats may be delivered in or through a variety of mechanisms, such as spearfish emails, clickable links, documents, executables, or archives. Other types of security threats may be posed by malicious users who gain access to a computer system and attempt to access, modify, or delete information without authorization.

BRIEF DESCRIPTION OF THE DRAWINGS

The detailed description is set forth with reference to the accompanying figures.

In the figures, the left-most digit(s) of a reference number identifies the figure in which the reference number first appears. The use of the same reference numbers in different figures indicates similar or identical items or features.

DETAILED DESCRIPTION

Figure 1:
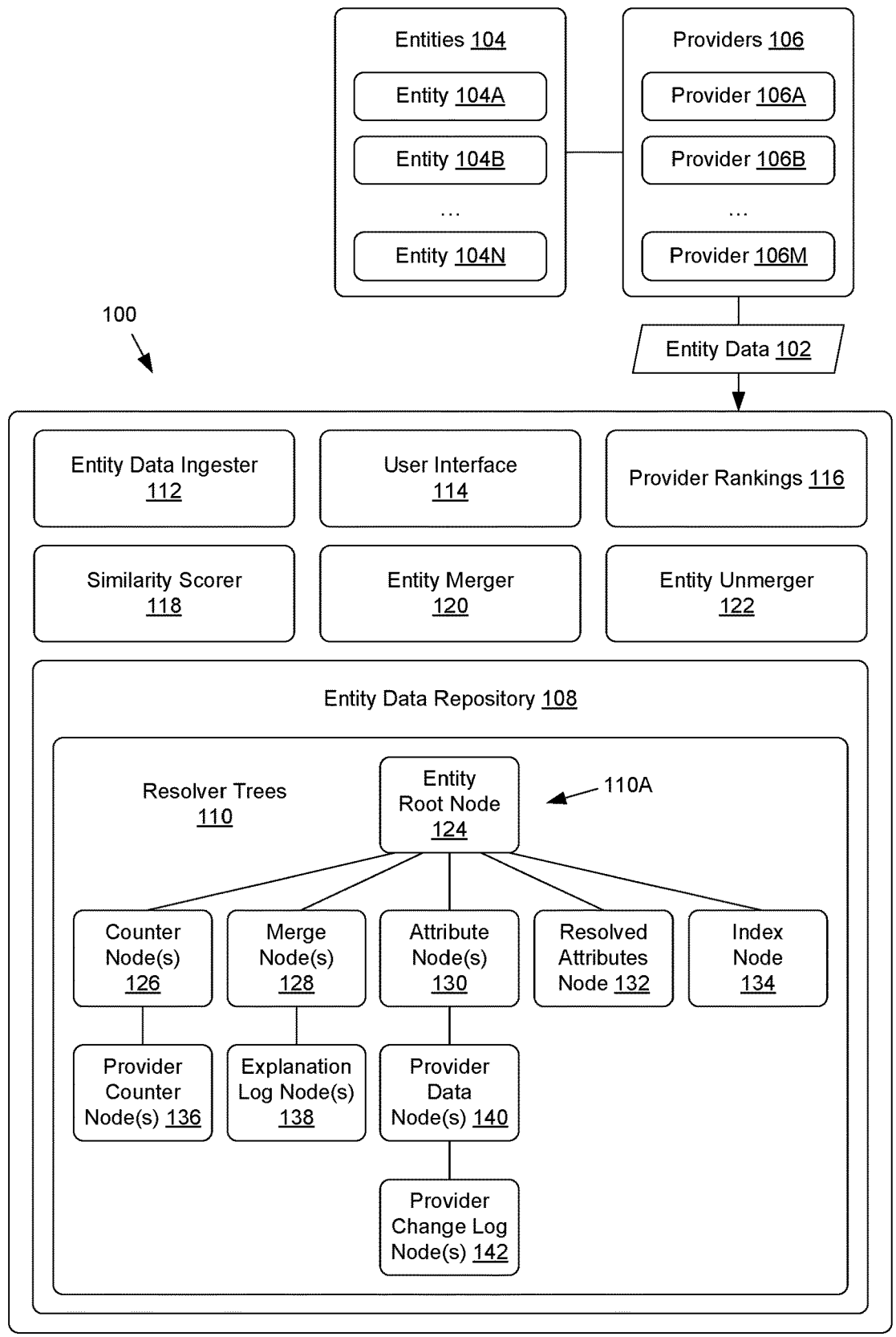
FIG. 1 shows an example of a digital security system configured to process entity data.

A digital security system can be configured to identify attacks or other security threats associated with one or more entities, such as computing devices, user accounts, and other assets, based on entity data associated with the entities. The entity data can be provided to the digital security system by multiple providers and/or multiple types of providers. For example, a provider can be a security agent installed on a computing device that is configured to identify events that occur on the computing device. In this example, the security agent can report entity data associated with the computing device to the digital security system. As another example, a provider can be a firewall or other network device that monitors network traffic between computing devices and can report entity data associated with those computing devices to the digital security system.

Different providers may provide entity data about the same entity to the digital security system. In some cases, for instance because different providers interact with the same entity in different ways, or collect different types of entity data, there may not be an initial indication to the digital security system that entity data received from different providers are associated with the same entity. The digital security system may accordingly at least initially store the entity data received from the different providers as entity data for separate entities.

For example, if a first provider provides an Internet Protocol (IP) address and a media access control (MAC) address associated with an entity, and a second provider provides a hostname associated with the entity, there may be no direct indication that the IP address and MAC address provided by the first provider is associated with the hostname provided by the second provider. Accordingly, the digital security system may initially store the entity data received from the first provider in association with a first entity, and initially store the entity data received from the second provider in association with a second entity.

If and when the digital security system later determines that entity data stored in association with different entities may be associated with the same entity, the digital security system can merge the entries and the corresponding entity data together. For instance, in the example above, the digital security system can merge the IP address and MAC address associated with the first entity with the hostname associated with the second entity to form a merged entity, if the digital security system determines that it is likely that the first entity and the second entity are in fact the same entity. Such merging of entities can consolidate entity data to preserve or free up memory space, reduce storage of redundant entity data, allow future entity data about the entity to be stored with the merged entity data, and/or otherwise more efficiently store and represent the entity data.

However, conventional entity consolidation techniques used in digital security systems often combine previously-separate entity data into a representation of a merged entity, and do not track how or why such merges occurred. Accordingly, when two entities are merged together using such conventional entity consolidation techniques, it may be difficult or impossible to undo or roll back that merge.

For example, if a digital security system determines that there is an 80% chance that a first entity is the same as a second entity, the digital security system may merge entity data associated with the first entity with entity data associated with the second entity to create a single merged entity. However, at a later point in time, additional information may indicate that, although there had been an 80% chance of the entities being the same, the entities are in fact different entities. At this point, the digital security system may be unable to determine which data in the merged entity had originally been associated with which entity, and may be unable to disentangle the entity data or unmerge the single entity back into a separate first entity and second entity.

Described herein are systems and methods associated with a digital security system that can address these and other deficiencies of digital security systems. For example, entity data associated with entities can be stored in resolver trees. If the digital security system determines that entities represented by different resolver trees are to be merged into a single entity, the digital security system can merge the resolver trees associated with the entities. The merged resolver tree can have a merge node that stores data associated with the merge operation, such that information about the merge operation can be tracked over time. The merged resolver tree can also have nodes that store entity data received from different providers. Such nodes can be tagged in association with the merge operation represented by the merge node of the resolver tree. Accordingly, upon an indication that the merge operation should be undone, the digital security system can use the merge node associated with the merge operation to identify data received from different providers that had been merged together, and can unmerge the entity by splitting the data associated with the different providers back into different entities represented by different resolver trees.

FIG. 1 shows an example of a digital security system 100 configured to process entity data 102 associated with entities 104. The digital security system 100 can receive entity data 102 from multiple providers 106. The digital security system 100 can have an entity data repository 108 that stores entity data 102 associated with entities 104 in corresponding resolver trees 110, such as the resolver tree 110A shown in FIG. 1. The resolver trees 110 associated with entities 104 can be merged. For example, the digital security system 100 may have a first resolver tree that stored entity data 102 associated with a first entity, and a second resolver tree that stored entity data 102 associated with a second entity. The entity data 102 in the first resolver tree and the second resolver tree may have been received from different providers 106. If the digital security system 100 later determines that the first entity and the second entity are likely to be the same entity, the digital security system 100 can merge the representations of the first entity and the second entity by merging the first resolver tree and the second resolver tree into a merged resolver tree. Merged resolver trees 110 can also store data that allows entity merges to be undone or otherwise rolled back. For example, if the digital security system 100 receives, after the merger of the two resolver trees 110 discussed above, a later indication that entity data 102 in the merged resolver tree received from different providers 106 is likely associated with different entities 104, the digital security system 100 can return the entity data 102 associated with the different providers 106 to separate resolver trees 110 and thereby split or unmerge the representations of the entities 104.

The entities 104 can be elements that may be targeted by malware and/or other security threats. For example, entities can include computers, servers, server racks, Information Technology (IT) infrastructure, cloud server instances, mobile phones, Internet of Things (IoT) devices, other types of machines or computing devices, networks, virtual machine images, software containers, software applications, social media accounts or other user accounts, user groups, companies or other organizations, buildings, campuses, and/or any other type of entity.

The digital security system 100 can receive entity data 102 associated with entities 104 from one or more providers 106. Individual providers 106 can be applications, monitors, scanners, agents, or other elements that can detect and/or collect one or more types of entity data 102 associated with one or more of the entities 104. For example, the providers 106 can include security agents, virus scanners, malware detectors, activity monitors, event detectors, firewalls, network monitors, or other security or monitoring agents that execute on computing devices and/or networks associated with the entities 104.

In some examples, a particular provider can be an executable application that is installed on, or otherwise executes on, a particular entity. As an example, if entity 104A in FIG. 1 is a computer, provider 106A may be a security agent installed on the computer that is configured to monitor events that occur on that computer. In other examples, a particular provider can be an application or other element that is associated with, or has access to, one or more entities 104. As an example, if entity 104A and entity 104B shown in FIG. 1 are computers on a network, provider 106B may be a firewall on the network that can access network traffic passing to and/or from entity 104A and entity 104B. As another example, if entity 104A is a social media account, provider 106A may be an application that monitors postings to the social media account, user logins to the social media account, and/or other activity associated with the social media account.

The digital security system 100 can have an entity data ingestor 112 configured to receive entity data 102 from one or more of the providers 106. For example, the digital security system 100 can have an application programming interface (API) or other interface that providers 106 can use to send entity data 102 to the digital security system 100 over the Internet and/or other data networks.

The entity data ingestor 112 can store entity data 102 received from providers 106 in the entity data repository 108, for instance in association with corresponding resolver trees 110. By storing the entity data 102 in the entity data repository 108, the digital security system 100 can organize the entity data 102, analyze the entity data 102, determine relationships between the entity data 102 or the corresponding entities 104, and/or otherwise process the entity data 102.

Figure 2:
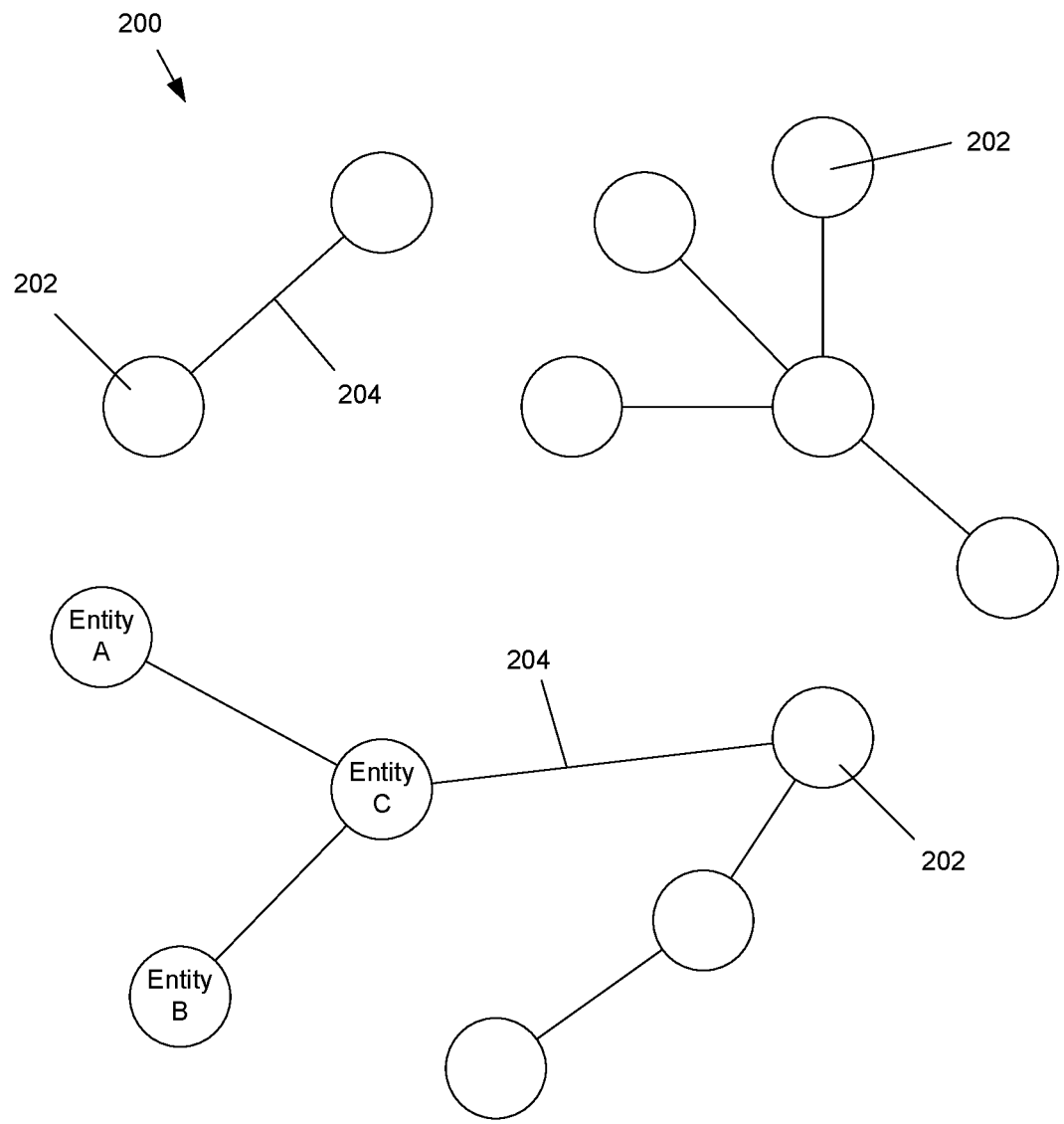
FIG. 2 shows an example of an entity graph.

In some examples, the entity data 102 stored in the entity data repository 108 can form, or be represented as, an entity graph that indicates behavior of entities 104 and/or relationships between entities 104. An example of an entity graph is shown in FIG. 2, and is discussed further below with respect to that figure. In these examples, representations of individual entities 104 in the entity graph can be, or include, at least a portion of the resolver trees 110 associated with the individual entities 104. For example, a value of a representation of a particular entity in the entity graph can be a resolver tree associated with that particular entity.

The digital security system 100 can also have a user interface 114. The user interface 114 can display entity data 102 associated with entities 104 that is stored in the entity data repository 108. For example, a user can use the user interface 114 to query and view entity data 102 associated with a particular entity that is stored in a corresponding resolver tree. As another example, a user can use the user interface 114 to view relationships between entities 104 and/or behavior of entities 104, for instance based on information stored in an entity graph associated with entity data repository 108, as discussed further below with respect to FIG. 2.

The entity data repository 108 can include one or more databases, or other data storage locations, configured to store entity data 102. In some examples, the entity data repository 108 can span multiple servers, databases, clusters, or nodes. In these examples, the entity data ingestor 112 can be configured to direct newly received entity data 102 that is associated with a particular entity to a server, database, cluster, or node that may already store existing entity data 102 associated with that particular entity.

The entity data ingestor 112 can, in some examples, have an ingestion buffer layer that can receive and collect entity data 102 associated with entities 104 over a period of time, before periodically or occasionally propagating collected entity data 102 into the entity data repository 108. As a non-limiting example, a particular entity may be a server that opens hundreds of network connections per hour. One or more providers 106 associated with the server may provide frequent entity data 102 associated with the server to the entity data ingestor 112 at a relatively high rate, such as a frequently updated counter that is incremented by the provider every time the server opens a network connection. In this example, rather than updating the entity data repository 108 each time the provider updates the counter associated with the server, the entity data ingestor 112 can receive and collect the frequent counter updates from the provider at the ingestion buffer layer, and then update a resolver tree and/or other corresponding entity data 102 in the entity data repository 108 with the most recent value of the counter once per hour, or on any other schedule.

In some examples, multiple providers 106 may provide the digital security system 100 with entity data 102 associated with the same entity. As a non-limiting example, provider 106A can be a security agent installed on entity 104A, while provider 106B can be a firewall that monitors network communications associated with entity 104A. Accordingly, in this example, provider 106A and provider 106B may both provide the digital security system 100 with entity data 102 associated with entity 104A. Individual resolver trees 110 in the entity data repository 108 can store entity data 102 provided by one or more providers 106. For example, the resolver tree 110A can be associated with a particular entity, and can store entity data 102 about the particular entity that has been provided by one or more providers 106.

If the entity data ingestor 112 determines that entity data 102 received from different providers 106 is associated with the same entity, the entity data ingestor 112 can use the received entity data 102 to update a corresponding resolver tree associated with that entity in the entity data repository 108. In some examples, the entity data ingestor 112 can use a primary key, indicated by a resolver tree associated with an entity, to determine whether entity data 102 received from different providers 106 is associated with that entity. Accordingly, if multiple providers 106 provide entity data 102 that reference the same primary key, the entity data ingestor 112 can determine that the entity data 102 received from the multiple providers 106 is associated with the same entity, and can store the entity data 102 received from the multiple providers 106 in the same resolver tree.

The digital security system 100 can have provider rankings 116 that indicate how to prioritize entity data 102 associated with the same entity that has been received from different providers 106, or different types of providers 106. The entity data ingestor 112, and/or other elements of the digital security system 100, can use the provider rankings 116 to resolve conflicts between entity data 102 received from different providers 106 about the same entity. As a non-limiting example, the provider rankings 116 may indicate that a type of security agent offered by the operator of the digital security system 100 is a provider that has the highest provider ranking, and that entity data 102 provided by that type of security agent should be accepted over conflicting entity data 102 provided by other types of providers 106. However, the provider rankings 116 may also indicate relative rankings of one or more types of providers 106, and/or indicate situations in which entity data 102 from one provider is to be accepted over entity data 102 from another provider. For instance, the provider rankings 116 can indicate that, if a first provider and a second provider both provide entity data 102 about the same entity, and there is inconsistent information in the entity data 102 from the two providers 106, the entity data 102 from the first provider should be used to update a corresponding resolver tree unless the entity data 102 from the second provider has a later timestamp.

As discussed above, the entity data ingestor 112 can be configured to use a primary key or other data to determine that entity data 102 received from different providers 106 is associated with the same entity, and use the entity data 102 to update a resolver tree corresponding to that entity. However, if the entity data ingestor 112 is unable to determine that entity data 102 received from different providers 106 is associated with the same entity, the entity data ingestor 112 may create different resolver trees 110 in the entity data repository 108 and/or store the entity data 102 in different resolver trees 110 that the digital security system 100 associates with different entities 104.

For example, if new entity data 102 received from a provider does not include a primary key, or includes a primary key and/or indexing information that is different from information stored in existing resolver trees 110 associated with known entities 104, the entity data ingestor 112 may create a new resolver tree for a new entity in the entity data repository 108 and store the new entity data 102 in the new resolver tree.

Accordingly, in some situations, the digital security system 100 may create different resolver trees 110 that the digital security system 100 at least initially associates with different entities 104. However, the resolver trees 110 can store data that allows the digital security system 100 to merge and unmerge resolver trees 110 associated with entities 104.

For example, the digital security system 100 can have a similarity scorer 118 configured to evaluate similarities between entity data 102 stored in different resolver trees 110, and to generate a corresponding similarity score. The digital security system 100 can also have an entity merger 120 that can determine, based on the similarity scorer 118 generating a similarity score that is equal to or above a threshold, that different resolver trees 110 are likely to represent the same entity. The entity merger 120 can accordingly join the resolver trees 110 to create a merged resolver tree that represents the entity. The digital security system 100 can additionally have an entity unmerger 122 that is configured to unmerge previously merged resolver trees 110. For example, if the entity merger 120 merges two resolver trees 110 based on a first determination that the two resolver trees 110 likely represented the same entity, but subsequent information leads to a second determination that those two resolver trees 110 were more likely associated with different entities 104, the entity unmerger 122 can use information stored in the merged resolver tree to split the merged resolver tree into two resolver trees 110 associated with the different entities 104. In various examples, the similarity scorer 118, the entity merger 120, and/or the entity unmerger 122 can be the same component, or different components, of the digital security system 100.

Figure 3A:
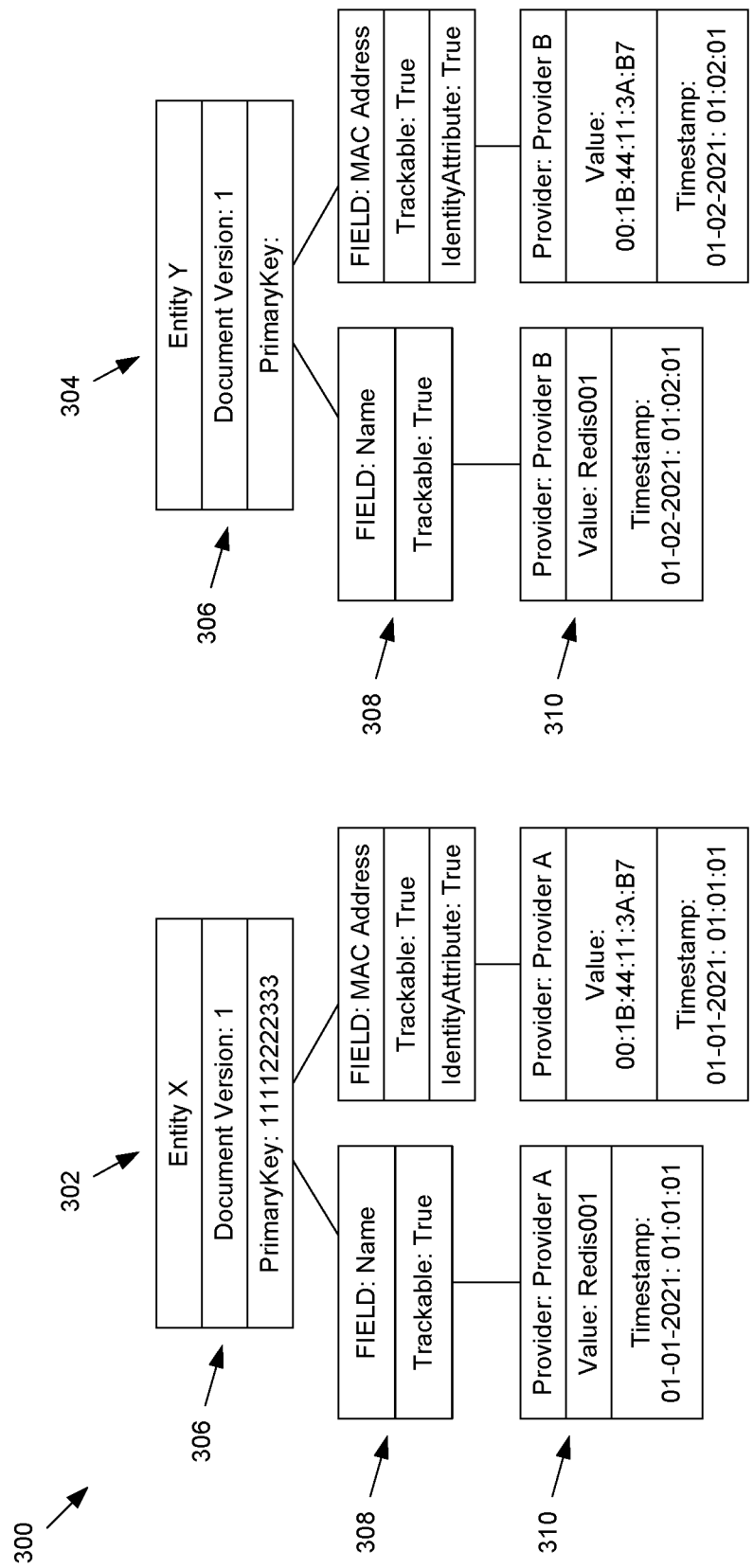
FIGS. 3A and 3B show an example in which separate resolver trees associated with entity data can be merged together.
Figure 3B:
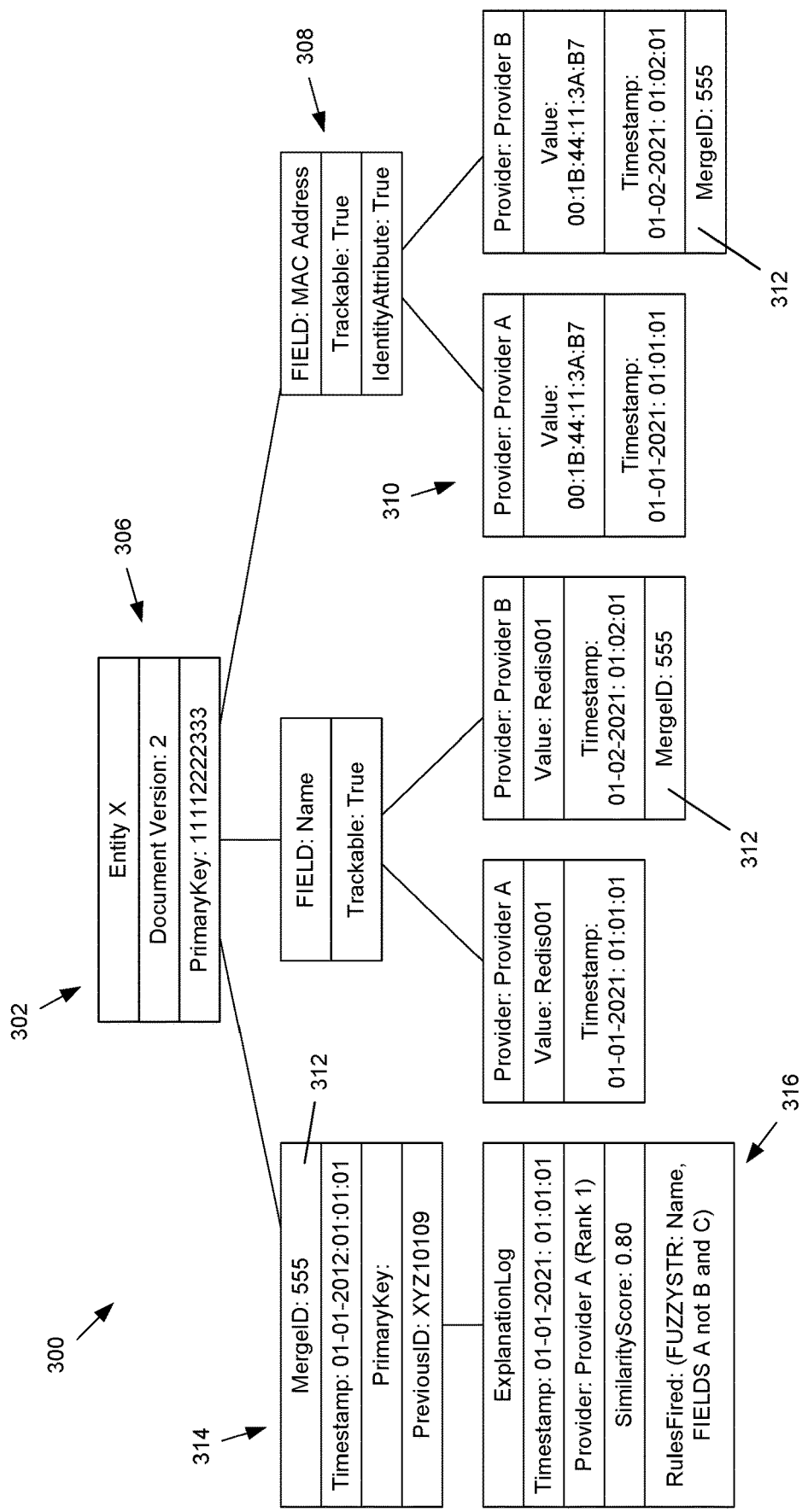

A resolver tree associated with a particular entity, such as the resolver tree 110A shown in FIG. 1, can include an entity root node 124 that branches to one or more other types of child nodes, such as such as counter nodes 126, merge nodes 128, attribute nodes 130, a resolved attributes node 132, and an index node 134. Individual counter nodes 126 can branch to child nodes, such as provider counter nodes 136 associated with different providers 106. Individual merge nodes 128 can be associated with merge operations that have occurred in association with the resolver tree, and can branch to child nodes, such as explanation log nodes 138 that store information associated with different merge operations. Individual attribute nodes 130 can branch to child nodes, such as provider data nodes 140 that store information provided by different providers 106 for corresponding types of attributes, and provider change log nodes 142 that indicate changes to the attribute information provided by the different providers 106 over time. In some examples, one or more of these types of nodes can be absent in a resolver tree. For instance, if a resolver tree does not include data merged from multiple resolver trees 110, the resolver tree may not have merge nodes 128 and/or other nodes associated with a previous merge of resolver trees 110. Examples of nodes in separate and merged resolver trees 110 are shown in FIGS. 3A and 3B, and are discussed further below with respect to those figures.

The entity root node 124 of a resolver tree associated with an entity can indicate an identification number, or other identifier, that uniquely identifies the resolver tree in the entity data repository 108. The entity root node 124 can also include fields for other types of information, such as an entity type of the corresponding entity, a customer identifier associated with a customer of the digital security system 100, a document version identifier, a transaction identifier, a primary key associated with the corresponding entity, and/or other information. In some examples, one or more of the fields of the entity root node 124 can be blank, for instance if corresponding entity data 102 has not yet been received or determined by the digital security system 100.

In some examples, the document version identifier in the entity root node 124 of a resolver tree can be used for Optimistic Concurrency Control (OCC) for writes to the resolver tree. For instance, if a user uses the user interface 114 to access a version of the resolver tree associated with document version one indicated in the entity root node 124, the user may provide user input via the user interface 114 to edit data in the resolver tree. However, in the meantime, new entity data 102 may have arrived from a provider and been used to update the resolver tree, causing the document version identifier in the entity root node 124 to increment to document version two. In this situation, conflicting user-provided edits associated with document version one may be rejected by the digital security system.

A resolver tree can, in some examples, have one or more counter nodes 126. Counter nodes 126 can be associated with counters or other data that can be incremented over time as new entity data 102 is received from different providers 106. A particular counter node can branch to one or more provider counter nodes 136 that correspond with the same or different types of counters associated with entity data 102 provided by different providers 106. For example, provider 106A can be associated with a first provider counter node in resolver tree 110A that tracks counter information received from provider 106A about the entity associated with resolver tree 110A, while provider 106B can be associated with a second provider counter node in resolver tree 110A that tracks counter information received from provider 106B about the entity associated with resolver tree 110A.

As discussed above, in some examples the entity data ingestor 112 can have an ingestion buffer layer that can receive and collect entity data 102 associated with entities 104 over a period of time, before periodically or occasionally propagating collected entity data 102 into the entity data repository 108. Accordingly, over a period of time, the entity data ingestor 112 can collect updates to provider counters submitted by one or more providers 106 about the entity associated with resolver tree 110A. The entity data ingestor 112 can then periodically use the collected updates to the provider counters to edit and update corresponding provider counter nodes 136 in the resolver tree 110A, for instance based on the most recent value of the respective provider counters.

If a resolver tree includes merged data based on one or more previous merge operations that merged separate resolver trees 110 together, the resolver tree can include merge nodes 128 and child explanation log nodes 138 that correspond to the previous merge operations. A merge node associated with a previous merge operation can indicate a merge identifier, such as a number or other identifier, that uniquely identifies the previous merge operation. The merge node can also include other information, such as a timestamp indicating when the merge operation occurred, an identifier of a rule set that led to the merge operation, a primary key associated with the merge operation, an identifier of another previous resolver tree that was merged into the current resolver tree, and/or other data associated with the merge operation. The explanation log node associated with the merge node can indicate additional information associated with the merge operation, such as information indicating why the entity merger 120 determined that the merge operation should be performed. The explanation log node can, for example, indicate a timestamp, an identifier of a provider associated with the original resolver tree into which another resolver tree was merged, a similarity score generated by the similarity scorer 118 that led the entity merger 120 to determine that the merge operation should be performed, indications of rules in a rule set that the similarity scorer 118 used to determine the similarity score, and/or other data explaining reasons for the merge operation.

A resolver tree can have one or more attribute nodes 130 that are associated with attribute types or attribute fields. As a non-limiting example, the resolver tree 110A can have a first attribute node associated with a "name" field, a second attribute node associated with an "instance type" field, a third attribute node associated with a "first seen" field, and/or other attribute nodes 130 associated with other types of fields.

Each of the attribute nodes 130 in a resolver tree can branch to one or more provider data nodes 140 that store information associated with the corresponding attribute that has been provided by a different provider. If only one provider has provided entity data 102 with a value for the attribute field or type associated with an attribute node, that attribute node can branch to a provider data node that stores the value provided by that provider. However, if multiple providers 106 have provided entity data 102 with values for the attribute field or type associated with an attribute node, that attribute node can branch to multiple provider data nodes 140 corresponding with the different providers, which can store the values provided by each of the providers. For example, if the resolver tree 110A has a first attribute node associated with a "name" field, and two providers 106 have provided name information associated with the corresponding entity, the first attribute node can branch to a first provider data node that stores first name information associated with the entity that has been provided by a first provider, and to a second provider data node that stores second name information associated with the entity that has been provided by a second provider. The values for the same attribute provided by each provider may be the same or different, but can be tracked in separate provider data nodes 140. The provider data nodes 140 can also indicate other data, such as timestamps indicating when each of the providers 106 submitted information stored in the provider data nodes 140.

If the resolver tree is a merged resolver tree formed by one or more merge operations, provider data nodes 140 that contain information merged from one or more previously-separate resolver trees 110 can be tagged with merge identifiers associated with those merge operations. For example, as discussed above, a merged resolver tree can contain a merge node that indicates a merge identifier of a corresponding merge operation. Any provider data nodes 140 that were merged into the resolver tree from a previously-separate resolver tree during that merge operation can be tagged with the same merge identifier of the merge operation. Accordingly, provider data nodes 140 merged into the resolver tree during a merge operation can be identified based on the merge identifier stored in the merge node that corresponds to the merge operation. If a merge operation is to be rolled back, the merge identifier associated with the merge operation can accordingly allow the entity unmerger 122 to identify provider data nodes 140 associated with the merge operation, and copy or move those provider data nodes 140 back to a separate resolver tree.

Each of the attribute nodes 130 can indicate other information, such as flags or other values indicating whether change logs associated with the corresponding attribute type are to be tracked in provider change log nodes 142 in the resolver tree, whether updates to the corresponding attributes should be kept over time or if the first value should be kept, and/or other information. For example, if a "Trackable" field in an attribute node associated with a particular attribute is set to "true," the value of the "Trackable" field can indicate that updates to the attribute received from one or more providers 106 over time should be tracked in corresponding provider change log nodes 142 that branch from the provider data nodes 140. The provider change log nodes 142 can store histories of changes to a value of the corresponding attribute received from providers 106 over a period of time, and can include timestamps of the individual changes. Accordingly, the digital security system 100 can use different provider change log nodes 142 associated with the same attribute in a resolver tree to track information provided for that attribute by different providers 106 over time.

As a non-limiting example, if the resolver tree 110A associated with an entity has an attribute node associated with a "IP address" field, the "IP address" attribute node can branch to different provider data nodes 140 configured to store the most recent IP address associated with the entity reported by different providers 106. If the "IP address" attribute node has a "Trackable" field set to "true," the provider data nodes 140 associated with each provider can also branch to corresponding provider change log nodes 142 that store histories of the IP addresses reported by the corresponding providers 106.

In some examples, the provider change log nodes 142 can be configured to store up to a maximum number of values, or a rolling window of values, received from corresponding providers 106. As a non-limiting example, a provider change log node associated with an "IP address" attribute node and a particular provider in a resolver tree for an entity can be configured to store up to the last twenty IP addresses reported by the particular provider for the entity.

In some examples, a resolver tree can have the resolved attributes node 132. The resolved attributes node 132 can indicate values of attributes, associated with the attribute nodes 130, that have been accepted by the digital security system 100 as the current values for those attributes. For example, if the resolver tree 110A can has a "name" attribute node and an "instance type" attribute node, those attribute nodes 130 can have provider data nodes 140 indicating "name" and "instance type" values provided by multiple providers 106. However, the digital security system 100 can accept one of the values for each of those attributes, and can store the accepted values in the resolved attributes node 132. As an example, if multiple providers 106 provided the same name for a "name" attribute, that name can be indicated in the resolved attributes node 132. However, if different providers 106 provided different names for the "name" attribute, the digital security system 100 can use the provider rankings 116 to resolve the conflict and determine which name value to use. For instance, if a first provider provided a first name value, and a second provider provided a second name value, and the first provider has a higher ranking than the second provider in the provider rankings 116, the digital security system 100 can store the first name value provided by the higher-ranked first provider in the resolved attributes node 132. In this example, although the first name value can be stored in the resolved attributes node 132 instead of the second name value, the first name value can also be stored in a first provider data node associated with the first provider, and the second name value can be stored in a second provider data node associated with the second provider.

The digital security system 100 can use the values of attributes stored in the resolved attributes node 132 as the current values for those attributes associated with the entity corresponding to the resolver tree. For example, if a user accesses data associated with the entity corresponding with resolver tree 110A in the user interface 114, the user interface 114 can display the attribute values stored in the resolved attributes node 132. The user interface 114 may in some examples, default to not showing provider-specific values for those attributes that are stored in the provider data nodes 140 or provider change log nodes 142. However, the user interface 114 may have an option to selectively display such provider-specific values for the attributes instead of, or in addition to, the values of the attributes stored in the resolved attributes node 132.

A resolver tree can also include the index node 134. The index node 134 can indicate attributes, times, and/or other information by which the resolver tree is indexed within the entity data repository 108. For example, the entity data repository 108 can include different clusters or servers that store entity data 102 associated with different operating system versions. Accordingly, the index node 134 may indicate that a resolver tree associated with an entity is being indexed within the entity data repository 108 based on an operating system version associated with the entity.

In some examples, the similarity scorer 118 and/or entity merger 120 can be configured to evaluate a resolver tree for potential merging with another resolver tree based on changes to information in the index node 134, the entity root node 124, and/or other nodes. For example, if the index node 134 indicate that a resolver tree associated with an entity is being indexed based on an operating system version, but new entity data 102 associated with the entity indicates that the entity has upgraded to a newer operating system version, the similarity scorer 118 and/or entity merger 120 can determine whether the resolver tree can be merged with another resolver tree associated with the same entity that was already associated with the newer operating system version.

The digital security system 100 can, in some examples, store information associated with the resolver trees 110 as serialized blobs in the entity data repository 108. In some examples, the digital security system 100 also store serialized data, or other data, associated with some nodes of a resolver tree in memory that can be accessed relatively quickly, but store data associated other nodes of the resolver tree in other computer storage that may take longer to access. For example, data associated with nodes such as the entity root node 124 and the resolved attributes node 132 can be stored in memory with relatively quick read and write times, such that that data can be accessed relatively quickly when processing the entity graph, when accessing the data via the user interface 114, and/or during other operations. However, data for other nodes, such as the explanation log nodes 138, the provider data nodes 140, and/or other nodes that may be accessed less often can be archived in slower memory or other data storage elements. The data associated with those nodes can be accessed from the archive in the slower memory. Similarly, in other examples, a full snapshot of a resolver tree can be stored in slower storage, while the most-accessed nodes are kept in faster memory. Accordingly, the entity data repository 108 can, in some examples, keep a subset of the most-frequently accessed nodes of a resolver tree in faster memory, but can use an archive or snapshot from slower storage to "hydrate" data associated with less-frequently accessed nodes if and when those nodes are accessed.

As discussed above, the similarity scorer 118 can generate a similarity score indicating a measure of similarity between the data stored in two resolver trees 110. If the similarity score is equal to or above a threshold, indicating that the two resolver trees 110 are likely representing the same entity, the entity merger 120 can merge the resolver trees 110. For example, if the similarity scorer 118 compares a first resolver tree and a second resolver tree, and generates a corresponding similarity score that is above a threshold, the entity merger 120 can determine that a merge operation should be performed to merge the second resolver tree into the first resolver tree. The entity merger 120 can accordingly add a merge node to the first resolver tree that includes a merge identifier associated with the merge operation, and copy provider data nodes 140 and any associated provider change log nodes 142 from the second resolver tree into the first resolver tree under corresponding attribute nodes 130. The entity merger 120 can also tag the copied provider data nodes 140 with the merge identifier associated with the merge operation indicated in the merge node. Once the data from the second resolver tree has been copied into the first resolver tree, the entity merger 120 can delete the second resolver tree or mark the second resolver tree for later deletion. Accordingly, any subsequent entity data 102 associated with the entity received from providers 106 can be stored in the merged first resolver tree.

The similarity scorer 118 can use one or more rules, probabilistic models, trained machine learning models, or other algorithms or models to determine a similarity score associated with two resolver trees 110.

For example, the similarity scorer 118 can be configured to compare values of attributes stored in attribute nodes 130 of two resolver trees 110 to generate a similarity score associated with the two resolver trees 110. In some examples, the similarity scorer 118 can use approximate string matches (ASM) on text values, which may cause the similarity scorer 118 to determine that names or other text stored in different resolver trees 110 match even if there are small misspellings or other inconsistencies between the values. The similarity scorer 118 can similarly use ranges of numerical values, or other fuzzy matching, to find matches in some types of attributes or data that may not be exact matches.

As a first example, the similarity scorer 118 can be configured to assign the highest possible similarity score to two resolver trees 110 if the two resolver trees 110 are associated with the same primary key. In this example, both resolver trees 110 having the same primary key can be a strong indicator that the resolver trees 110 are associated with the same entity. In some examples, if one resolver tree has a primary key, the similarity scorer 118 can search for that primary key in any field or attribute of the other resolver tree, as the primary key may be present in the other resolver tree but not be marked as a primary key.

As a second example, the similarity scorer 118 can be configured to generate a similarity score by adding a point for each value that matches in corresponding attribute nodes 130 of two resolver trees 110, and/or by adding partial points for each value in that partially matches in corresponding attribute nodes 130 of two resolver trees 110. For instance, the similarity scorer 118 can add a point if values of an IP address attribute match in both resolver trees 110, add a point if values of a hostname attribute match in both resolver trees 110, add a point if values of a MAC address attribute match in both resolver trees 110, and add a point if combinations of the values in the IP address attribute and MAC address attribute match in both resolver trees 110. The similarity scorer 118 can also be configured to add partial points for partial matches of these attributes. For instance, if IP addresses in IP address attribute nodes 130 of the two resolver trees 110 partially match, but are not an exact match, the similarity scorer 118 can also be configured to add 0.25 points. In this example, the threshold can be set at three points, or another threshold similarity score, such that the entity merger 120 can determine to merge the resolver trees 110 if the similarity score generated by the similarity scorer 118 meets or exceeds the threshold.

As a third example, the similarity scorer 118 can be configured to generate a similarity score by weighting matching values of different attributes, or different combinations of attributes, differently. For example, because many entities 104 may be associated with the same operating system version, the similarity scorer 118 may be configured to add zero points for matching values in operating system attribute nodes of two resolver trees 110. However, the similarity scorer may be assigned to add one point if hostnames in hostname attribute nodes 130 of two resolver trees 110 match, add one point if IP addresses in IP address attribute nodes 130 of the two resolver trees 110 match, add two points if MAC addresses in MAC address attribute nodes 130 of the two resolver trees 110 match, and add four points if combinations of IP address and MAC addresses in corresponding attribute nodes 130 of the two resolver trees 110 match. In this example, because two entities having the same combination of an IP address and a MAC address may be more likely to indicate that the two entities are really the same entity, the IP address and MAC address combination can be weighted more heavily than the hostname attribute that might be more likely to be shared by different entities.

In other examples, the similarity scorer 118 can be configured to assign predefined similarity scores based on comparisons between resolver trees 110. For example, the similarity scorer 118 can be configured to assign a first predefined similarity score if a first attribute matches in the two resolver trees 110, but combinations of a second attribute and a third attribute do not match in the two resolver trees 110. The similarity scorer 118 can also be configured to assign a second predefined similarity score if the first attribute does not match in the in the two resolver trees 110, but combinations of a fourth attribute and a fifth attribute do match in the two resolver trees 110.

The similarity scorer 118 can, in some examples, be configured to generate a similarity score associated with two resolver trees 110 based at least in part on behavior and/or relationship information indicated by an entity graph or other data. For example, as discussed further below with respect to FIG. 2, an entity graph can indicate behavior that connects entities. Accordingly, if the entity graph indicates that two entities have behaved similarly or identically over time, that may be a strong factor indicating that the two entities may actually be the same entity. The similarity scorer 118 can accordingly be configured to use or weight such relationship and/or behavioral information from an entity graph, instead of or in addition to data stored directly in the resolver trees 110, when generating a similarity score.

As a non-limiting example, two resolver trees 110 may indicate the same IP address and MAC address combination, which may be a relatively strong indicator that the two resolver trees 110 represent the same entity. However, it may be possible that one of two separate entities is misconfigured and was mistakenly using that IP address and MAC address combination, or that two separate entities briefly shared the IP address and MAC address combination. Accordingly, the common IP address and MAC address combination indicated in the two resolver trees 110 may not be sufficient on its own for the similarity scorer 118 to generate a similarity score that exceeds a threshold. However, if an entity graph or other data indicates that the entities associated with the two resolver trees 110 opened network connections to a particular IP address at roughly the same time, or otherwise behaved similarly or identically, that shared behavior in combination with the matching IP address and MAC address combination can more strongly indicate that the entities associated with the two resolver trees 110 are likely the same entity.

In some examples, the threshold similarly scores associated with various rules or models can be manually set. In other examples, the threshold similarly scores associated with various rules or models can be set automatically. For instance, a machine learning model can be trained to identify threshold similarity scores that indicate when resolver trees 110 are most likely to be associated with the same entity. Such a machine learning model can be trained on a training data set that includes some resolver trees 110 known to represent the same entities 104.

As discussed above, if the similarity scorer 118 compares two resolver trees 110 using one or more rules and/or models, and generates a similarly score that meets or exceeds a corresponding threshold, the entity merger 120 can merge the resolver trees 110 into a single resolver tree. For instance, the entity merger 120 can merge one of the two resolver trees 110 into the other resolver tree. In some examples, if one of the resolver trees 110 was created after the other resolver tree, the entity merger 120 can keep the resolver tree that was created first, and merge the later-created resolver tree into that earlier-created resolver tree. In other examples, if the two resolver trees 110 were associated with different providers 106, the entity merger 120 can keep the resolver tree associated with the provider ranked higher in the provider rankings 116, and can merge the other resolver tree into the resolver tree associated with the higher-ranked provider.

In some examples or situations, the entity merger 120 can link separate resolver trees 110 instead of merging the resolver trees 110. For example, rules or other configurations in the digital security system 100 may prevent the merger of resolver trees associated with different customer identifiers. Accordingly, if a similarity score associated with two resolver trees 110 indicates that the resolver trees 110 likely represent the same entity, but entity root nodes of the two resolver trees 110 have different customer identifiers, the entity merger 120 can link the resolver trees 110 instead of merging the resolver trees 110. Linking resolver trees 110 can keep the resolver trees 110 stored separately in the entity data repository 108, but can indicate a likelihood that the resolver trees 110 represent the same entity. In some examples, the entity merger 120 can link two resolver trees 110 by adding nodes or other data to the resolver trees 110 that reference identifiers of the other resolver tree. In other examples, the entity merger 120 can link two resolver trees 110 by generating a new resolver tree that represents the linked resolver trees 110 and can store subsequent information for the entity, but prior information for the entity can remain stored in the previously-existing resolver trees 110.

Overall, the entity merger 120 can merge two resolver trees 110 if a similarity score, generated by the similarity scorer 118, is equal to or above a corresponding threshold and thus indicates a strong likelihood that the two resolver trees 110 represent the same entity. However, although the similarity score may have indicated a strong likelihood of the entities associated with the resolver trees being the same entity, subsequent information may reveal that the entities are not the same entity, or are less likely to be the same entity. In these situations, the entity unmerger 122 can use information in a merge node and corresponding provider data nodes 140 of a merged resolver tree to unmerge the resolver tree back into separate resolver trees 110 associated with different entities.

For example, a user using the user interface 114 may be able to determine that although two resolver trees 110 were merged because of a common IP address, other information indicates that the same IP address was used simultaneously on different networks or subnetworks, or was used by different device types at different times. Accordingly, the user can provide an unmerge command, via the user interface 114, that causes the entity unmerger 122 to roll back the merger of the two resolver trees 110 by unmerging the merged resolver tree based on data in the merge node and corresponding provider data nodes 140.

As another example, the similarity scorer 118 can be configured to evaluate a merged resolver tree that contains data merged from a first resolver tree and a second resolver tree. The similarity scorer 118 may determine that the data in the merged resolver tree that was originally stored in the second resolver tree has a higher similarity with data in a separate third resolver tree than data in the merged resolver tree that was originally held in the first resolver tree. Accordingly, in this situation, the entity unmerger 122 can roll back the merger of the first resolver tree and a second resolver tree, such that the first resolver tree and the second resolver tree again exist separately. Based on the evaluation by the similarity scorer 118, the entity merger 120 may then merge the restored second resolver tree with the similar third resolver tree.

Accordingly, the data stored in the resolver trees 110 can allow the digital security system 100 to merge resolver trees 110 if there is a likelihood that separate resolver trees 110 represent the same entity. The data stored in the resolver trees, such as the merge nodes 128 and corresponding provider data nodes 140 associated with the same merge identifier, can allow the digital security system 100 to unmerge previously-merged resolver trees 110 in situations in which subsequent information indicates that a merged resolver tree includes entity data 102 associated with different entities 104.

FIG. 2 shows an example of an entity graph 200. The entity graph 200 can be based on entity data 102, associated with entities 104, stored in the entity data repository 108. The entity graph 200 can include representations of individual entities 104, and can indicate behavior of the entities 104 and/or relationships between the entities 104. For example, the entity graph 200 can include different vertices 202 that represent different entities 104, and can include edges 204 that connect vertices 202 that represent related entities 104.

Vertices 202 and/or edges 204 associated with entities 104 can indicate behavior of the entities 104 and/or relationships between the entities 104. For example, if entity data 102 or other data received from one or more providers 106 indicates that a first entity opened a network connection to a second entity, the digital security system 100 can indicate details about that that connection by an edge in the entity graph 200 that links vertices 202 representing the first entity and the second entity, or by another type of vertex that is linked to the vertices 202 representing the first entity and the second entity.

As discussed above, the entity data repository 108 can include resolver trees 110 associated with entities 104, such as the resolver tree 110A shown in FIG. 1. Individual vertices 202 of the entity graph 200 that represent different entities 104 can accordingly be associated with resolver trees 110 that correspond to those entities 104. In some examples, a value of an entity represented in the entity graph 200 can be at least a portion of a resolver tree that corresponds to that entity.

For instance, as discussed above, the entity data repository 108 may store data associated with frequently-accessed nodes of a resolver tree in memory that has relatively fast read and/or write speeds, but store other less-frequently-accessed nodes of the resolver tree in slower data storage elements. Accordingly, a representation of an entity in the entity graph 200 can include the entity root node 124, the resolved attributes node 132, and/or other frequently-accessed nodes of a corresponding resolver tree. The entity graph 200 can be "hydrated" with additional information stored in less-frequently accessed nodes of the resolver tree, for instance if data associated with those nodes is accessed via the user interface 114 of if such data may help determine relationships between entities in the entity graph 200.

Additionally, as discussed above, in some examples, the similarity scorer 118 can be configured to use or consider behavior and/or relationship information indicated by the entity graph 200 when generating similarity scores associated with separate resolver trees 110. For example, information stored in resolver trees 110 associated with Entity A and Entity B may not be sufficient to indicate that Entity A and Entity B are the same entity. However, the entity graph 200 may indicate that Entity A and Entity B have exhibited similar or identical behavior over a period of time. For instance, the entity graph 200 may indicate that Entity A and Entity B both connected to Entity C, as shown in FIG. 2, at the same or similar times. This shared behavior and/or relationship information may indicate a likelihood that Entity A and Entity B are the same entity, and allow the similarity scorer 118 to increase the similarity score associated with Entity A and Entity B to at or above a threshold level such that the entity merger 120 can merge the resolver trees 110 associated with Entity A and Entity B. Such a merger of the resolver trees 110 associated with Entity A and Entity B can also cause the corresponding vertices 202 associated with Entity A and Entity B in the entity graph 200 to be combined.

FIGS. 3A and 3B show an example 300 in which separate resolver trees 110 can be merged together. FIG. 3A shows a first resolver tree 302 associated with Entity X and a second resolver tree 304 associated with Entity Y. The first resolver tree 302 and the second resolver tree 304 can both include entity root nodes 306, similar to the entity root node 124 shown in FIG. 1. The first resolver tree 302 and the second resolver tree 304 can both include attribute nodes 308, similar to the attribute nodes 130 shown in FIG. 1. For example, the first resolver tree 302 and the second resolver tree 304 can each include "name" attribute nodes and "MAC address" attribute nodes 308. However, the first resolver tree 302 and the second resolver tree 304 can be associated with different providers 106. For example, the first resolver tree 302 can include provider data nodes 310, similar to the provider data nodes 140 shown in FIG. 1, that store data received from Provider A, while the second resolver tree 304 can include provider data nodes 310 that store data received from Provider B.

At a point in time corresponding to FIG. 3A, the digital security system 100 may not yet have determined that Entity X and Entity Y may be likely to be the same entity. The digital security system 100 can accordingly have generated separate resolver trees 110 for Entity X and Entity Y. For example, the entity data ingestor 112 may be configured to use a primary key associated with an entity to determine when new entity data 102 should be used to update an existing resolver tree associated with that entity. In this example, the entity data 102 provided by Provider B may not have included a primary key. Accordingly, because the entity data ingestor 112 could not match the entity data 102 from Provider B with the primary key indicated in the first resolver tree 302, the entity data ingestor 112 may have created the second resolver tree 304 to store the entity data 102 received from Provider B.

However, the information stored in the provider data nodes 310 of the first resolver tree 302 and the second resolver tree 304 can be similar. For instance, the provider data nodes 310 indicate that Provider A provided entity data 102 indicating a name of "Redis001" and a MAC address of "00:1B: 44:11:3A: B7" for Entity X, while Provider B provided similar entity data 102 approximately one day later indicating the same name and MAC address for Entity Y. Based on the similarity of the entity data 102 provided for Entity X and Entity Y, the similarity scorer 118 may generate a similarity score above a corresponding threshold that indicates a relatively high likelihood that Entity X and Entity Y are the same entity. Accordingly, the entity merger 120 can perform a merge operation to merge the second resolver tree 304 into the first resolver tree 302.

FIG. 3B shows a merged version of the first resolver tree 302 that includes data merged from the second resolver tree 304. For example, FIG. 3B can correspond to a point in time after the entity merger 120 has merged the second resolver tree 304 shown in FIG. 3A into the first resolver tree 302. As shown in FIG. 3B, the entity merger 120 can have maintained the provider data nodes 310 in the first resolver tree 302 that stored data provided by Provider A under the "name" and "MAC Address" attribute nodes 308. However, the entity merger 120 can have copied or moved the provider data nodes 310 that had indicated data provided by Provider B, and had been associated with corresponding "name" and "MAC Address" attribute nodes 308 in the second resolver tree 304, into new provider data nodes 310 that branch from the "name" and "MAC Address" attribute nodes 308 of the first resolver tree 302. Accordingly, in FIG. 3B, the "name" and "MAC Address" attribute nodes 308 of the first resolver tree 302 can each branch into separate provider data nodes 310 associated with data provided by Provider A and Provider B.

In this example, because the provider data nodes 310 in the first resolver tree 302 that are associated with Provider B were copied or moved from the second resolver tree 304 during the merge operation, the provider data nodes 310 associated with Provider B can be tagged with a merge identifier 312 that is uniquely associated with that merge operation.

As shown in FIG. 3B, the entity merger 120 can have added a merge node 314, similar to the merge nodes 128 shown in FIG. 1, to the first resolver tree 302 during the merge operation to merge the second resolver tree 304 into the first resolver tree 302. The merge node 314 can indicate the merge identifier 312 that is uniquely associated with that merge operation. Accordingly, the merge identifier 312 of the merge operation that merged the second resolver tree 304 into the first resolver tree 302 can be indicated in both the merge node 314 and in any provider data nodes 310 that were added to the first resolver tree 302 based on the merge operation. The merge node 314 can include additional information associated with the merge operation, such as a timestamp indicating when the merge operation was performed, a value of a primary key formerly stored in the second resolver tree 304, a previous identifier of the second resolver tree 304 in the entity data repository 108, and/or any other data associated with the merge operation.

The merge node 314 can branch to a corresponding explanation log node 316, similar to the explanation log nodes 138 shown in FIG. 1. The explanation log node 316 can include information indicating how and/or why the corresponding merge operation was performed by the entity merger 120. For example, the explanation log node 316 can include information indicating why the second resolver tree 304 was merged into the first resolver tree 302 instead of the first resolver tree 302 being merged into the second resolver tree 304. For instance, the explanation log node 316 may indicate that the second resolver tree 304 was merged into the first resolver tree 302 because Provider A, originally associated with the first resolver tree 302, had a higher ranking than Provider B previously associated with the second resolver tree 304. As another example, the explanation log node 316 can include the similarity score generated by the similarity scorer 118 based on a comparison of the first resolver tree 302 and the second resolver tree 304, and/or indications of rules or models used by the similarity scorer 118 to generate the similarity score.

Although not shown in FIGS. 3A and 3B, because the "name" and "MAC Address" attribute nodes 308 have fields marked "Trackable: True," the provider data nodes 310 that branch from those attribute nodes 308 can branch further into provider change log nodes 142 that can store histories of updates to the "name" and "MAC Address" information provided over time by Provider A and Provider B.

If at a later point in time after the merge operation to merge the second resolver tree 304 into the first resolver tree 302, the entity unmerger 122 may determine to undo the merge operation associated with the merge identifier 312. If the merge operation is to be undone, the entity unmerger 122 can determine the merge identifier 312 associated with the merge operation from the merge node 314. The entity unmerger 122 can identify the provider data nodes 310 that are associated with that merge identifier 312, and accordingly determine which provider data nodes 310 were added to the first resolver tree 302 during the merge operation identified by the merge identifier 312. The entity unmerger 122 can accordingly copy or move those provider data nodes 310 back to a new or restored instance of the second resolver tree 304. In some examples, the entity unmerger 122 can also use other information in the merge node 314 to populate the entity root node of the new or restored instance of the second resolver tree 304. The entity unmerger 122 can additionally delete the merge node 314 and provider data nodes 310 associated with the merge identifier 312 from the first resolver tree 302. Accordingly, the entity unmerger 122 can unmerge the first resolver tree 302 and restore the first resolver tree 302 and the second resolver tree 304 to the state shown in FIG. 3A.

Figure 4:
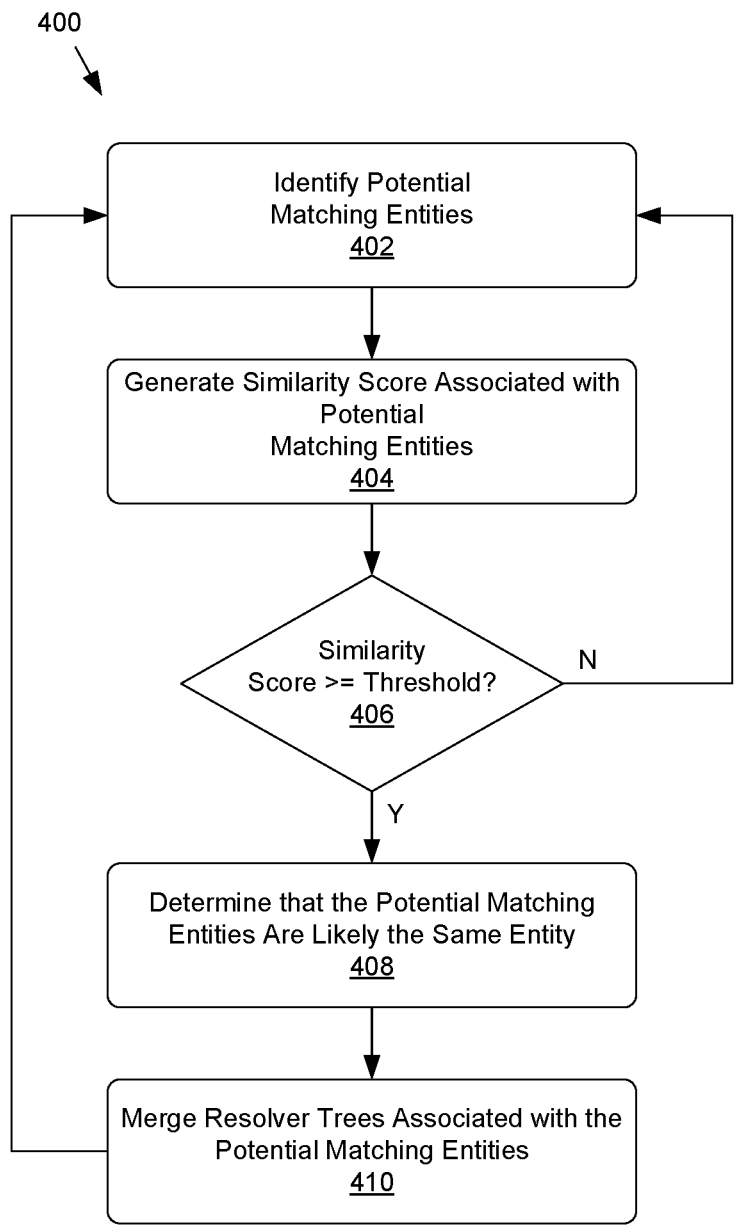
FIG. 4 shows a flowchart of an example process for merging resolver trees associated with entities.

FIG. 4 shows a flowchart of an example process 400 for merging resolver trees 110 associated with entities 104. The example process 400 shown in FIG. 4 may be performed by a computing system, such as the computing system shown and described with respect to FIG. 6, that executes the similarity scorer 118, the entity merger 120, and/or other elements of the digital security system 100.

At block 402, the digital security system 100 can identify potential matching entities 104, based on information stored in resolver trees 110 associated with the potential matching entities 104. The digital security system 100 can identify potential matching entities 104 by identifying corresponding resolver trees 110 in the entity data repository 108 that have at least some data in common. If two resolver trees 110 have at least some data in common, the digital security system 100 can determine that those resolver trees 110 represent potential matching entities 104 at block 402.

To search for potential matching entities, the digital security system 100 can identify a first resolver tree associated with a particular candidate entity, and search for a second resolver tree that shares at least some data with the first resolver tree. In some examples, the first resolver tree can be a new or updated resolver tree. Accordingly, when a resolver tree is newly created or updated in the entity data repository 108, the digital security system 100 can search for another resolver tree that has the same primary key as the new or updated resolver tree, has at least some of the same indexing information as the new or updated resolver tree, has the same or similar values for one or more types of attributes, or otherwise has at least some data in common with the new or updated resolver tree. In other examples, the digital security system 100 can periodically or occasionally scan through existing resolver trees 110 in the entity and search for potential matches for selected resolver trees 110.

In some examples, the digital security system 100 can use indexing information associated with a resolver tree to identify a pool of other resolver trees 110 that share the same indexing information. As discussed above, the index node 134 of a resolver tree can indicate attributes, times, and/or other information by which the resolver tree is indexed within the entity data repository 108, such as operating system information. Accordingly, if the digital security system 100 determines that the index node 134 of a resolver tree identifies particular indexing data, the digital security system 100 can identify a potential matching entity by searching among other resolver trees with index nodes identifying the same indexing data, rather than searching among all of the resolver trees 110 in the entity data repository 108. However, in other examples, the digital security system 100 can search all of the resolver trees 110 in the entity data repository 108, or any other subset of resolver trees 110 in the entity data repository 108, to identify a potential matching entity.

At block 404, the digital security system 100 can generate a similarity score associated with the potential matching entities 104 identified at block 402. For example, the similarity scorer 118 can use data stored in the resolver trees 110 associated with the potential matching entities 104 to generate a similarity score indicating a likelihood that the resolver trees 110 represent the same entity. As described above, the similarity scorer 118 can use one or more rules, probabilistic models, trained machine learning models, or other algorithms or models to determine the similarity score associated with the resolver trees 110. In some examples, the similarity scorer 118 can be configured to generate the highest possible similarity score if both resolver trees 110 identify the same primary key. However, if the primary keys of both resolver trees 110 do not match, or if one or both resolver trees 110 do not have a primary key, the similarity scorer 118 can use one or more rule sets or models to generate the similarity score based on matches or partial matches of values for one or more types of attributes, based on similarities between behavior of the entities and/or their relationships with other entities, and/or based on other factors.

At block 406, the digital security system 100 can determine whether the similarity score generated at block 404 is equal to or above a threshold. In some examples, the threshold can correspond to a particular model or rule set that the similarity scorer 118 used to generate the similarity score at block 404. If the similarity score is below the threshold (Block 406—No), digital security system 100 can determine that although the entities 104 identified at block 402 were potential matches, the similarity score being below the threshold indicates that the entities 104 are not likely to be the same entity. Accordingly, the digital security system 100 can return to block 402 and identify different potential matching entities 104.

However, if the similarity score associated with two potential matching entities 104 is equal to or above the threshold (Block 406—Yes), the digital security system 100 can determine at block 408 that the two potential matching entities 104 are likely the same entity. Accordingly, at block 410, the digital security system 100 can merge the resolver trees 110 associated with the two potential matching entities 104 into a single resolver tree associated with the entity.

For example, at block 410 the digital security system 100 can perform a merge operation to merge information into a first resolver tree associated with a first one of the potential matching entities 104 from a second resolver tree associated with a second one of the potential matching entities 104. The digital security system 100 can subsequently use the first resolver tree, including the information merged into the first resolver tree from the second resolver tree, to represent the entity.

The merge operation performed at block 410 can be associated with a particular merge identifier. The digital security system 100 can add a merge node to the first resolver tree that indicates the particular merge identifier and other information associated with the merge operation. The digital security system can also copy or move provider data nodes 140 associated with one or more attribute nodes 130 from the second resolver tree into the first resolver tree, and tag those provider data nodes 140 with the particular merge identifier. Accordingly, the provider data nodes 140 merged into the first resolver tree during the merge operation can be identified based on the particular merge identifier.

The merge operation can include determining values, in provider data nodes 140 associated with different providers 106, to indicate in the resolved attributes node 132 of the first resolver tree. If, for a particular attribute node, multiple provider data nodes 140 indicate the same value for a corresponding attribute, the digital security system 100 can store that value in the resolved attributes node 132. However, if different provider data nodes 140 indicate different values for a particular attribute, the digital security system 100 can use provider rankings 116 or other conflict resolution rules to select which value, from which provider, to reflect in the resolved attributes node 132.

After merging the resolver trees 110 associated with potential matching entities 104 at block 410, based on a determination that the potential matching entities 104 are likely the same entity, the digital security system 100 can return to block 402 and identify different potential matching entities 104. Over time, the digital security system 100 can repeat the blocks of process 400 for different sets of potential matching entities 104, to merge resolver trees 110 if and when the digital security system 100 determines that different resolver trees 110 in the entity data repository 108 are likely representing the same entity.

If the digital security system 100 determines that a merger of two resolver trees 110 into a single resolver tree is to be undone, the digital security system 100 can identify data in the resolver tree tagged with a corresponding merge identifier. The digital security system 100 can return that data to a separate resolver tree, for example as discussed below with respect to FIG. 5.

Figure 5:
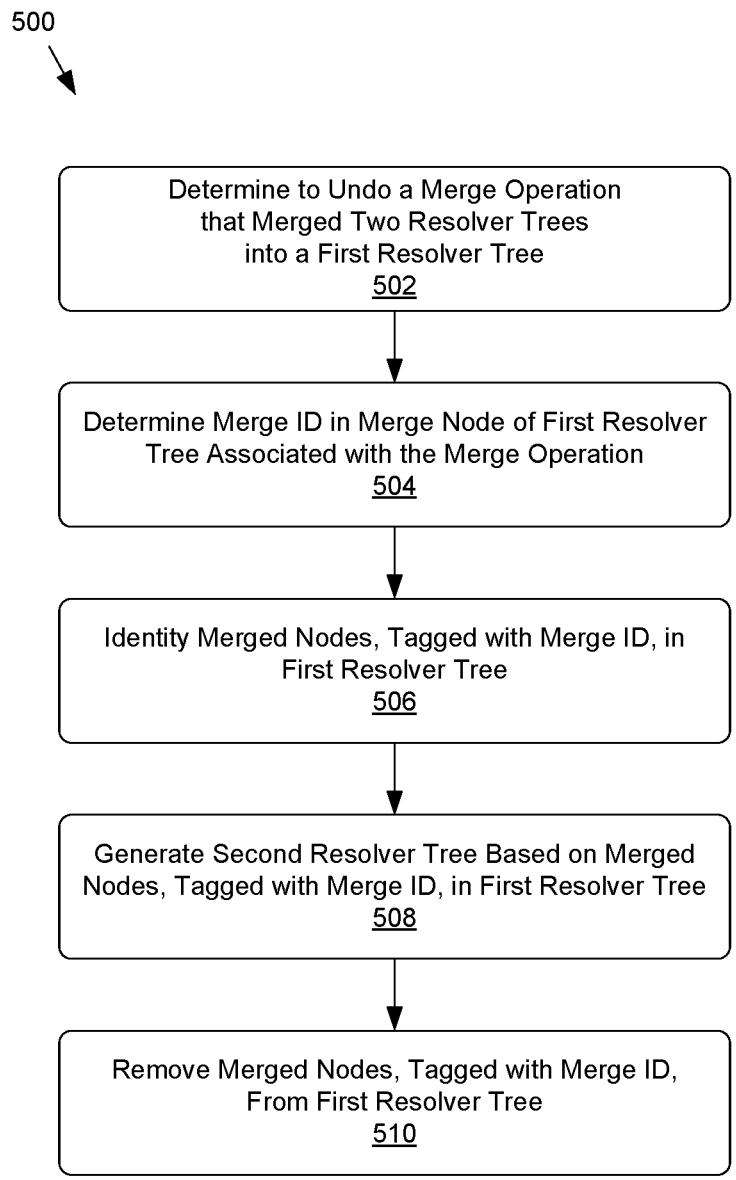
FIG. 5 shows a flowchart of an example process for unmerging resolver trees associated with entities.

FIG. 5 shows a flowchart of an example process 500 for unmerging resolver trees 110 associated with entities 104. The example process 500 shown in FIG. 5 may be performed by a computing system, such as the computing system shown and described with respect to FIG. 6, that executes the entity unmerger 122 and/or other elements of the digital security system 100.

At block 502, the digital security system 100 can determine to undo a merge operation that previously merged two resolver trees 110 into a first resolver tree. The merge operation may have been performed using process 400, shown in FIG. 4, due to a determination the two resolver trees 110 were likely representing the same entity. However, at block 502, the digital security system 100 can determine that merge operation caused the first resolver tree to include data associated with multiple entities 104. For example, the digital security system 100 can receive user input via the user interface 114 indicating that two entities, associated with the two resolver trees 110 merged into the first resolver tree, are not the same entity. Accordingly, the user input can be an explicit or implicit instruction to undo the merge operation that merged those two resolver trees 110. As another example, new entity data 102 received after the merge operation can cause the similarity scorer 118 to determine a new similarity score that is below a corresponding threshold. Based on the new similarity score being below the threshold, the digital security system 100 to determine that the two entities, associated with the two resolver trees 110 merged into the first resolver tree, are not likely to be the same entity, and thus that the merge operation is to be undone.

At block 504, the digital security system 100 can determine the merge identifier associated with the merge operation that previously merged the two resolver trees 110 into the first resolver tree. The merge identifier can be indicated by a merge node of the first resolver tree that stores information associated with the merge operation. The digital security system 100 can use the merge identifier of the merge operation to identify, at block 506, merged nodes of the first resolver tree that are tagged with the merge identifier. In some examples, the merged nodes can include nodes that branch from nodes tagged with the merge identifier, such as provider change log nodes 142 that indicate updates to provider data received before and/or after the merge operation.

For example, provider data nodes 140 merged from another resolver tree into the first resolver tree during the merge operation can be tagged with the merge identifier of the merge operation. Accordingly, the digital security system 100 can find provider data nodes 140 tagged with that merge identifier, as well as any corresponding provider change log nodes 142 and/or other associated nodes.

At block 508, the digital security system 100 can generate a second resolver tree based on the merged nodes of the first resolver tree identified at block 506. As a non-limiting example, if three provider data nodes 140 are tagged with the merge identifier, those three provider data nodes 140 can have been merged into the first resolver tree from another resolver tree during the merge operation. Accordingly, the digital security system 100 can move those three provider data nodes 140, as well as any corresponding child provider change log nodes 142, to a new or restored second resolver tree.

At block 510, the digital security system 100 can remove the merged nodes identified at block 506 from the first resolver tree. In some examples, the digital security system 100 can also remove the merge node associated with the merge operation from the first resolver tree. In other examples, the digital security system 100 can edit the merge node to indicate that the merge operation has been undone.

Accordingly, because data associated with a particular merge operation can be stored in a resolver tree in association with a merge identifier of the merge operation, the digital security system 100 can undo or roll back that merge operation at a later time. For instance, if resolver trees associated with two entities 104 are merged together in response to a determination that it is likely that the two entities are the same entity, but later information reveals that the two entities are more likely to be different entities 104, the digital security system 100 can undo the merge operation. The digital security system 100 can, for example, identify data stored within a resolver tree that had been merged into the resolver tree during a particular merge operation, and undo that merge operation by restore the identified data to a separate resolver tree.

Figure 6:
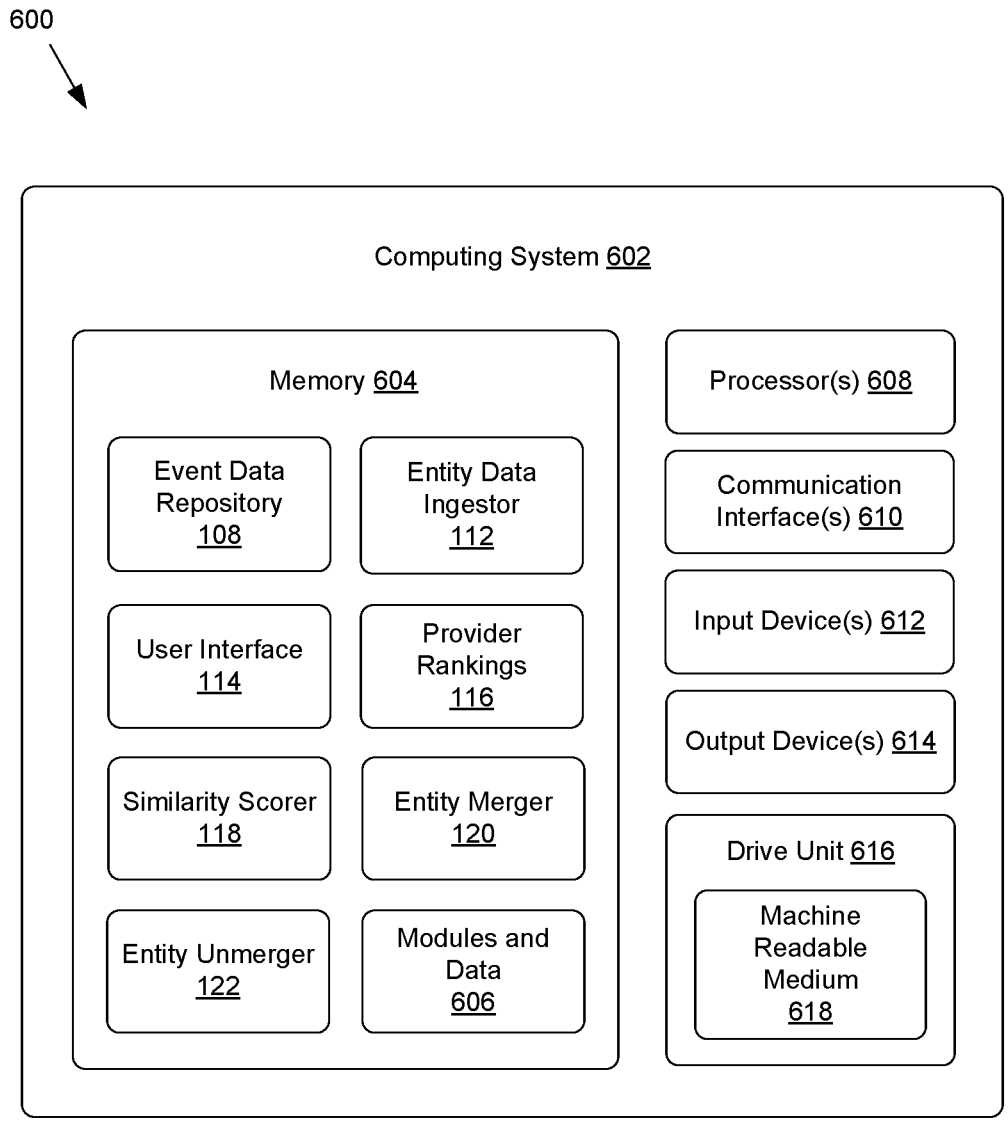
FIG. 6 shows an example system architecture for a computing system associated with the digital security system.

FIG. 6 shows an example system architecture 600 for a computing system 602 associated with the digital security system 100 described herein. The computing system 602 can include one or more servers, computers, or other types of computing device that can execute one or more elements of the digital security system 100. In some examples, the computing system 602 can execute virtual machines, cloud instances, and/or other elements associated with one or more elements of the digital security system 100.

The computing system 602 can include memory 604. In various examples, the memory 604 can include system memory, which may be volatile (such as RAM), non-volatile (such as ROM, flash memory, non-volatile memory express (NVMe), etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 602. Any such non-transitory computer-readable media may be part of the computing system 602.

The memory 604 can store data associated with the entity data repository 108, the entity data ingestor 112, the user interface 114, the provider rankings 116, the similarity scorer 118, the entity merger 120, the entity unmerger 122, and/or any other element of the digital security system 100. For example, the memory 604 can store data associated with the entity data repository 108, such as instances of entity data 102, corresponding resolver trees 110, an entity graph 200, and/or other data. The memory 604 can also store other modules and data 606. The modules and data 606 can include any other modules and/or data that can be utilized by the computing system 602 to perform or enable performing the actions described herein. Such other modules and data can include a platform, operating system, and applications, and data utilized by the platform, operating system, and applications.

The computing system 602 can also have one or more processors 608. In various examples, each of the processors 608 can be a central processing unit (CPU), a graphics processing unit (GPU), both a CPU and a GPU, or any other type of processing unit. Each of the one or more processors 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 608 may also be responsible for executing computer applications stored in the memory 604, which can be associated with types of volatile and/or nonvolatile memory. For example, the processors 608 can access data and computer-executable instructions stored in the memory 604, and execute such computer-executable instructions.

The computing system 602 can also have one or more communication interfaces 610. The communication interfaces 610 can include transceivers, modems, interfaces, antennas, telephone connections, and/or other components that can transmit and/or receive data over networks, telephone lines, or other connections. For example, the communication interfaces 610 can include one or more network cards or other network interfaces that can be used to receive entity data 102 from providers 106.

In some examples, the computing system 602 can also have one or more input devices 612, such as a keyboard, a mouse, a touch-sensitive display, voice input device, etc., and/or one or more output devices 614 such as a display, speakers, a printer, etc. These devices are well known in the art and need not be discussed at length here.

The computing system 602 may also include a drive unit 616 including a machine readable medium 618. The machine readable medium 618 can store one or more sets of instructions, such as software or firmware, that embodies any one or more of the methodologies or functions described herein. The instructions can also reside, completely or at least partially, within the memory 604, processor(s) 608, and/or communication interface(s) 610 during execution thereof by the computing system 602. The memory 604 and the processor(s) 608 also can constitute machine readable media 618.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   determining, by a computing system, that two trees, of a plurality of trees that store data associated with corresponding entities, are likely to be associated with a same entity, based on a similarity score associated with the two trees exceeding a threshold;
   merging, by the computing system, and based on determining that the two trees are likely to be associated with the same entity, the two trees into a merged tree; and
   adding, by the computing system, a merge node to the merged tree, the merge node storing a merge identifier associated with the merging of the two trees.

2. The computer-implemented method of claim 1, further comprising tagging, by the computing system, instances of the data, added to the merged tree during the merging, with the merge identifier.

3. The computer-implemented method of claim 1, wherein:
   the merged tree is a first tree of the two trees,
   the merging comprises adding nodes from a second tree of the two trees into the merged tree, and
   the method further comprises tagging the nodes from the second tree, added to the merged tree, with the merge identifier.

4. The computer-implemented method of claim 1, wherein the two trees, prior to the merging, respectively store instances of the data that have been received from different providers or are associated with different primary keys.

5. The computer-implemented method of claim 1, wherein the merge node in the merged tree indicates at least one of:
   a timestamp indicating a time at which the two trees were merged into the merged tree,
   a rule identifier of a rule that caused the two trees to be merged into the merged tree,
   a primary key associated with the merging of the two trees into the merged tree, or
   a tree identifier of a third tree, different from the two trees, previously merged into the merged tree.

6. The computer-implemented method of claim 1, wherein the merge node in the merged tree is linked to an explanation log node, in the merged tree, that indicates at least one of:
   a timestamp,
   a provider identifier of a particular provider that was previously associated with one of the two trees,
   the similarity score, or
   a rule identifier of a rule used to generate the similarity score.

7. The computer-implemented method of claim 1, wherein the merged tree comprises:
   an attribute node associated with a data field,
   a first provider data node, linked to the attribute node, that indicates a first value of the data field provided by a first provider associated, prior to the merging, with a first tree of the two trees, and
   a second provider data node, linked to the attribute node, that indicates the merge identifier and a second value of the data field provided by a second provider associated, prior to the merging, with a second tree of the two trees.

8. The computer-implemented method of claim 7, wherein:
   the merged tree further comprises a resolved attribute node indicates a current value of the data field associated with the attribute node, and
   the method further comprises selecting, by the computing system, the current value from among the first value and the second value based at least on part on provider rankings associated with the first provider and the second provider.

9. The computer-implemented method of claim 7, wherein the merged tree further comprises a provider change log, associated with the first provider data node, that indicates a history of values for the data field provided by the first provider over a period of time.

10. The computer-implemented method of claim 1, further comprising:
    determining, by the computing system, and at a time after the merging, to undo the merging of the two trees into the merged tree, based on additional data indicating that the two trees are unlikely to be associated with the same entity; and
    unmerging, by the computing system, the merged tree into the two trees, based at least in part on the merge identifier stored in the merge node.

11. The computer-implemented method of claim 10, wherein:
    instances of the data, added to the merged tree during the merging the merged tree, are tagged with the merge identifier, and
    the method further comprises:
      restoring, by the computing system, the instances of the data tagged with the merge identifier to a restored tree of the two trees; and
      removing, by the computing system, the instances of the data tagged with the merge identifier from the merged tree.

12. A computing system, comprising:
    one or more processors; and
    memory storing computer-executable instructions that, when executed by the one or more processors, cause the one or more processors to perform operations comprising:
      determining that two trees, of a plurality of trees that store data associated with corresponding entities, are likely to be associated with a same entity, based on a similarity score associated with the two trees exceeding a threshold;
      merging, based on determining that the two trees are likely to be associated with the same entity, the two trees into a merged tree; and
      adding a merge node to the merged tree, the merge node storing a merge identifier associated with the merging of the two trees.

13. The computing system of claim 12, wherein the operations further comprise tagging instances of the data, added to the merged tree during the merging, with the merge identifier.

14. The computing system of claim 13, wherein the operations further comprise:
   determining, at a time after the merging, to undo the merging of the two trees into the merged tree, based on additional data indicating that the two trees are unlikely to be associated with the same entity; and
   unmerging, the merged tree into the two trees, based at least in part on the merge identifier stored in the merge node by:
      restoring the instances of the data, tagged with the merge identifier in the merged tree, to a restored tree of the two trees; and
      removing the instances of the data tagged with the merge identifier from the merged tree.

15. The computing system of claim 12, wherein the merge node in the merged tree indicates at least one of:
   a timestamp indicating a time at which the two trees were merged into the merged tree,
   a rule identifier of a rule that caused the two trees to be merged into the merged tree,
   a primary key associated with the merging of the two trees into the merged tree, or
   a tree identifier of a third tree, different from the two trees, previously merged into the merged tree.

16. The computing system of claim 12, wherein the merged tree comprises:
   an attribute node associated with a data field,
   a first provider data node, linked to the attribute node, that indicates a first value of the data field provided by a first provider associated, prior to the merging, with a first tree of the two trees, and
   a second provider data node, linked to the attribute node, that indicates the merge identifier and a second value of the data field provided by a second provider associated, prior to the merging, with a second tree of the two trees.

17. One or more non-transitory computer-readable media storing computer-executable instructions that, when executed by one or more processors, cause the one or more processors to perform operations comprising:
   determining that two trees, of a plurality of trees that store data associated with corresponding entities, are likely to be associated with a same entity, based on a similarity score associated with the two trees exceeding a threshold;
   merging, based on determining that the two trees are likely to be associated with the same entity, the two trees into a merged tree; and
   adding a merge node to the merged tree, the merge node storing a merge identifier associated with the merging of the two trees.

18. The one or more non-transitory computer-readable media of claim 17, wherein the operations further comprise tagging instances of the data, added to the merged tree during the merging, with the merge identifier.

19. The one or more non-transitory computer-readable media of claim 18, wherein the operations further comprise:
   determining, at a time after the merging, to undo the merging of the two trees into the merged tree, based on additional data indicating that the two trees are unlikely to be associated with the same entity; and
   unmerging, the merged tree into the two trees, based at least in part on the merge identifier stored in the merge node by:
      restoring the instances of the data, tagged with the merge identifier in the merged tree, to a restored tree of the two trees; and
      removing the instances of the data tagged with the merge identifier from the merged tree.

20. The one or more non-transitory computer-readable media of claim 17, wherein the merged tree comprises:
   an attribute node associated with a data field,
   a first provider data node, linked to the attribute node, that indicates a first value of the data field provided by a first provider associated, prior to the merging, with a first tree of the two trees, and
   a second provider data node, linked to the attribute node, that indicates the merge identifier and a second value of the data field provided by a second provider associated, prior to the merging, with a second tree of the two trees.

* * * * *